United States Patent [19]

Soohoo

[11] Patent Number: 5,448,315
[45] Date of Patent: Sep. 5, 1995

[54] SYSTEM AND METHOD OF INTERACTIVELY FORMING AND EDITING DIGITAL USER-ARRANGED VIDEO STREAMS IN REAL-TIME FROM A PLURALITY OF SIMULTANEOUSLY-DISPLAYED DIGITAL SOURCE VIDEO STREAMS

[75] Inventor: Kenneth Soohoo, Milpitas, Calif.

[73] Assignee: Digital Pictures, Inc., San Mateo, Calif.

[21] Appl. No.: 273,264

[22] Filed: Jul. 8, 1994

Related U.S. Application Data

[63] Continuation of Ser. No. 153,306, Nov. 16, 1993, abandoned, which is a continuation of Ser. No. 944,955, Sep. 15, 1992, Pat. No. 5,331,417.

[51] Int. Cl.$^6$ ............................................. H04N 5/42
[52] U.S. Cl. ..................................... 348/722; 348/564
[58] Field of Search ........................ 360/13, 14.1, 14.2, 360/14.3; 358/311; 348/722, 903, 564, 584, 588; 395/152–161; H04N 5/42

[56] References Cited

U.S. PATENT DOCUMENTS

| | | | |
|---|---|---|---|
| 4,672,441 | 6/1987 | Hoelzlwimmer | 358/135 |
| 4,685,003 | 8/1989 | Westland | 360/14.1 |
| 4,821,101 | 7/1989 | Short | 358/181 |
| 4,847,690 | 7/1989 | Perkins | 358/143 |
| 4,849,817 | 7/1989 | Short | 358/142 |
| 4,964,004 | 10/1990 | Barker | 360/14.1 |
| 5,040,067 | 8/1991 | Yamazaki | 358/22 |
| 5,057,932 | 10/1991 | Lang | 360/14.1 |
| 5,109,482 | 4/1992 | Bohrman | 395/154 |
| 5,172,228 | 12/1992 | Israelsen | 358/86 |
| 5,218,672 | 6/1993 | Morgan et al. | 395/162 |
| 5,237,648 | 8/1993 | Mills et al. | 395/133 |

FOREIGN PATENT DOCUMENTS

| | | |
|---|---|---|
| 0098727 | 6/1983 | European Pat. Off. . |
| 0387981 | 1/1990 | European Pat. Off. . |
| 3293873 | 4/1990 | Japan . |
| 2229889 | 3/1990 | United Kingdom . |
| WO83/04121 | 5/1983 | WIPO . |
| WO86/01631 | 8/1985 | WIPO . |

*Primary Examiner*—Victor R. Kostak
*Assistant Examiner*—Nathan J. Flynn
*Attorney, Agent, or Firm*—Albert C. Smith; Amir H. Raubvogel

[57] ABSTRACT

A system and method of digital video editing simultaneously displays a plurality of source video windows on a screen, each window showing a digital source video stream. The user may select among the source video windows at any time while they are being shown. The selected digital source video stream appears in a record video window, and continues to run in real-time in both the selected source video window and the record video window. All windows continuously display real-time video streams. The user may continue to make selections among the source video windows as often as desired, and may also select transformations, or special effects, from an on-screen list. The video stream playing in the record window thus forms a digital user-arranged version of selected portions of the source video streams, plus transformations, as selected by the user. The user's selections are stored to permit subsequent playback of the digital user-arranged video stream in a playback window. A single digital audio stream, or selectable multiple digital audio streams, may accompany the source and user-arranged video streams.

27 Claims, 10 Drawing Sheets

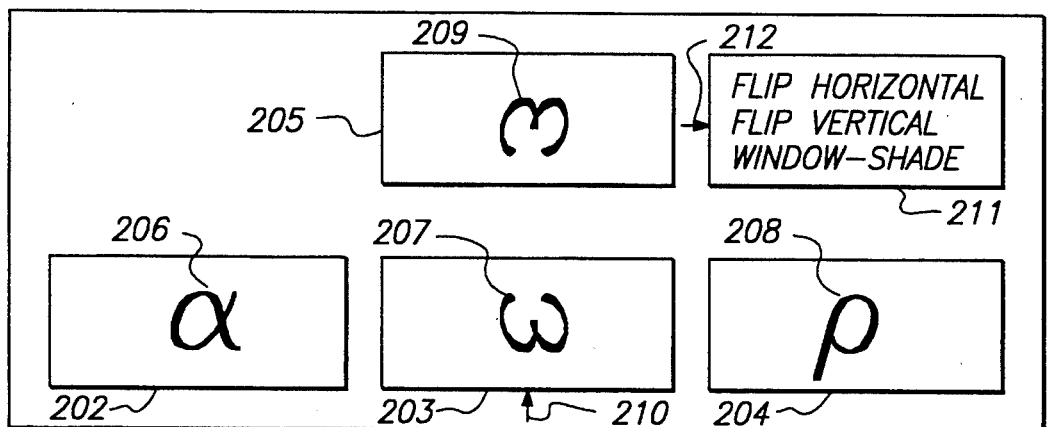
FIG. 2B
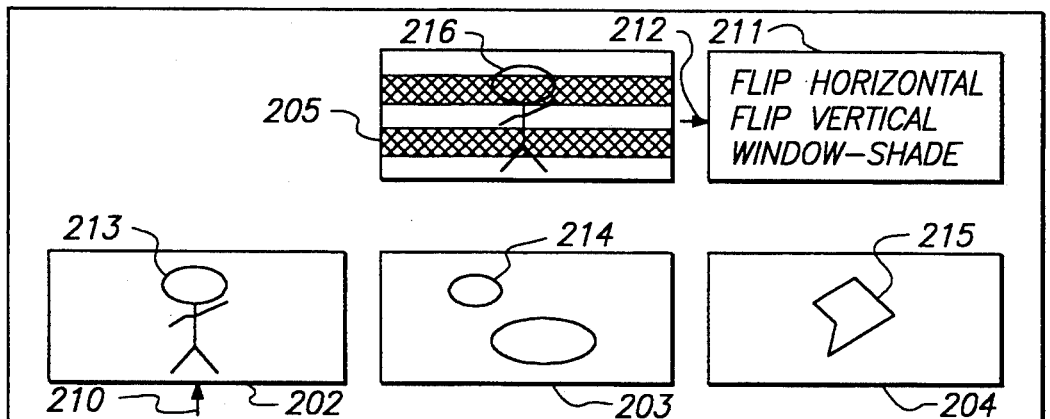
FIG. 2C
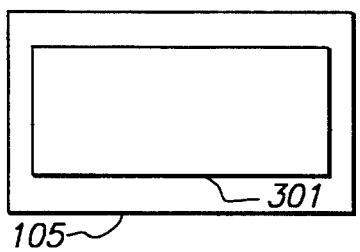 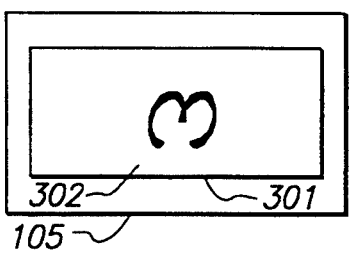 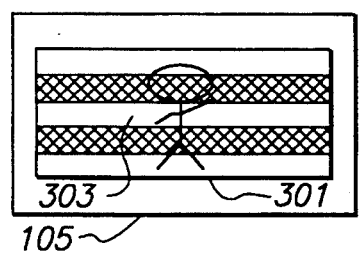
FIG. 3A   FIG. 3B   FIG. 3C

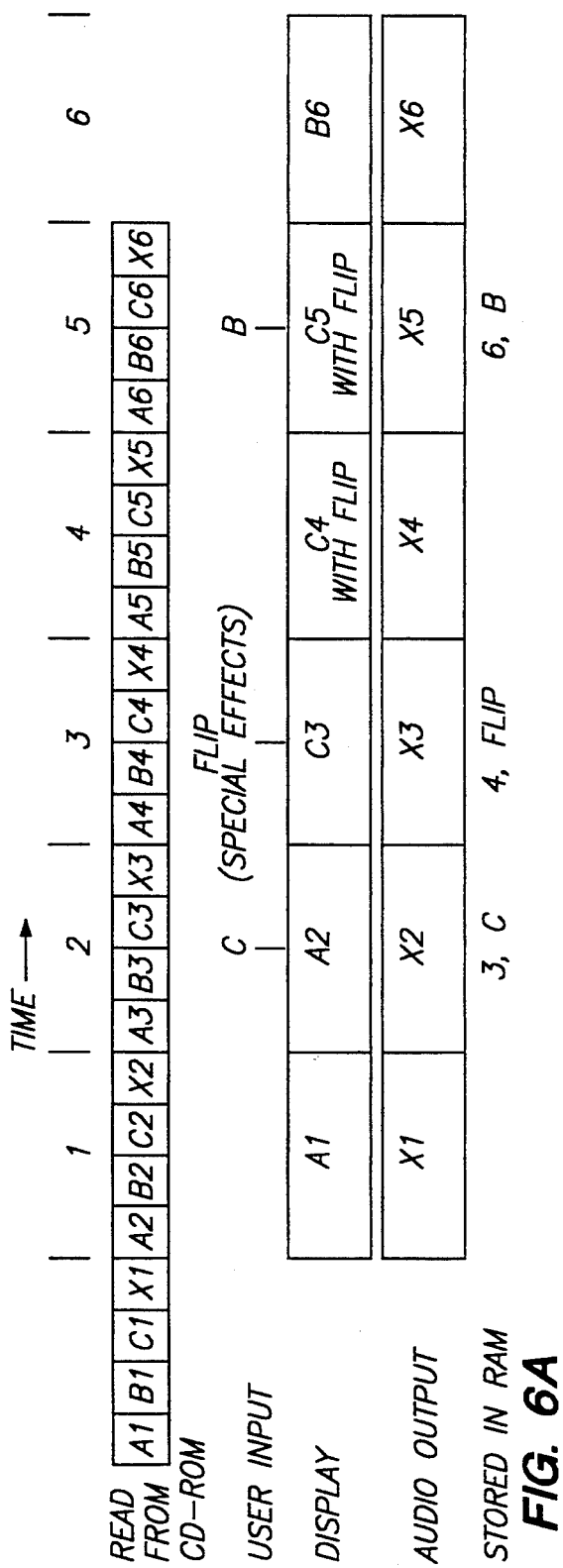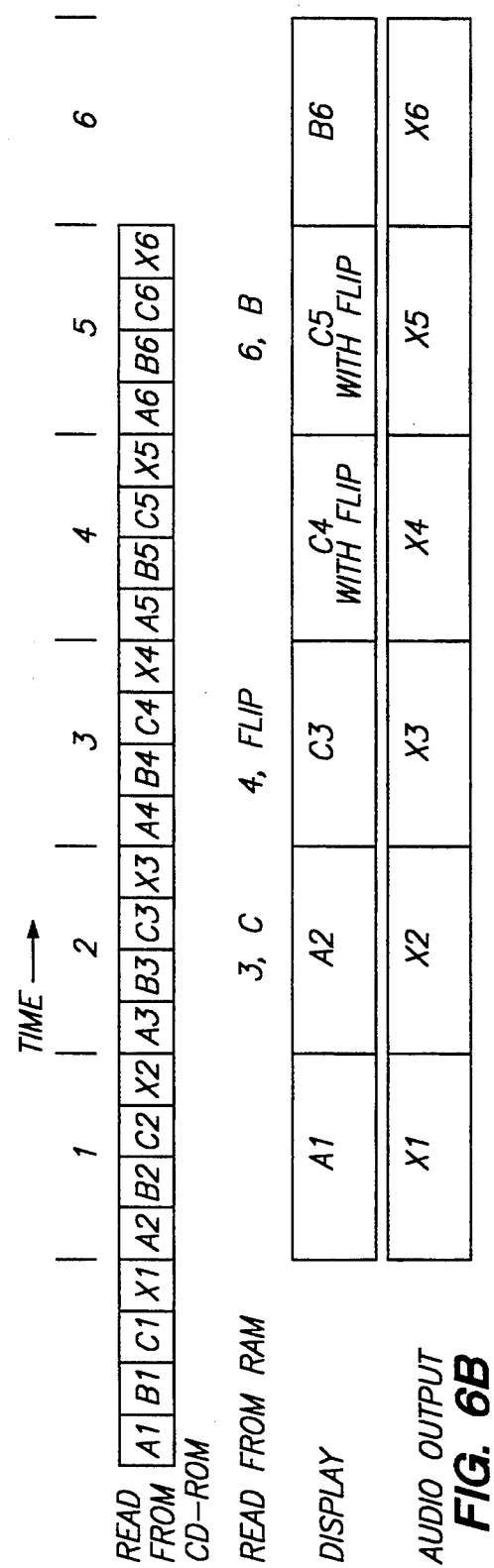
FIG. 6A
FIG. 6B

SYSTEM AND METHOD OF INTERACTIVELY FORMING AND EDITING DIGITAL USER-ARRANGED VIDEO STREAMS IN REAL-TIME FROM A PLURALITY OF SIMULTANEOUSLY-DISPLAYED DIGITAL SOURCE VIDEO STREAMS

Related Applications

This is a continuation of application Ser. No. 08/153,306 filed on Nov. 16, 1993, now abandoned, which is a continuation of Ser. No. 07/944,955 filed Sep. 15, 1992 now U.S. Pat. No. 5,331,417.

BACKGROUND OF THE INVENTION

1. Field of the Invention

This invention relates to the field of digital video and audio editing, and, more particularly, to a system and method of selecting among simultaneously accessible on-screen digital source video streams in real-time to form a digital user-arranged video stream.

2. Description of the Related Art

Typically, music videos are produced by professional video production companies in association with musical artists. A music video usually contains a series of video images accompanying a musical soundtrack such as a song. The video images may portray the artist or artists performing the song, as well as other scenes, representations, animated sequences, and special effects. It is typical to repeatedly switch among, or inter-cut, these various images throughout the music video, as well as to inter-cut among several camera angles for a particular scene. Additionally, special effects consisting of various video and audio transformations are often performed on selected portions of the images and soundtrack.

When viewing a completed music video, either from a broadcast or cable source, or from another pre-recorded video source, the viewer/consumer is not given the opportunity to interact with the product at all. In particular, he or she is not able to control, adjust, or modify the camera angles, choice of scenes, inter-cut points, or transformations selected by the producer of the music video. The viewer is merely a passive observer of the finished product.

In contrast, in the field of video games, consumer interaction with the product is considerable. The consumer does not merely view the product; he or she plays it, responding to the images and sounds produced by the game and providing input to the game. The game in turn responds to the consumer's input, altering its sequence of images and sounds accordingly. The interaction and responsiveness found in video games provides a continual and interesting challenge to the consumer, as new variations of the basic elements of the game are always possible.

SUMMARY OF THE INVENTION

In accordance with the present invention, there is provided a system and method of permitting user interaction with music videos so that the user may select various combinations of camera angles, scenes, inter-cut points, and transformations at will. In this way, users can create variations of music videos.

The present invention allows such interaction in real-time, while a music video is playing. The preferred embodiment outputs a digital musical soundtrack, and simultaneously displays a plurality of source video windows on a screen, each window showing a digital source video stream associated with and synchronous with the musical soundtrack. The source video streams and the audio stream which forms the soundtrack are preferably stored in interleaved digital format on a CD-ROM, although other digital storage techniques may be used.

There is also a separate window, referred to as a record video window, preferably on the same screen as the source video windows. The user may select among the source video windows at any time while they are being shown. As soon as a selection is made, the selected source video stream appears in the record video window, and continues to run in real-time in both the selected source video window and the record video window. The record video window and the source video windows continuously display real-time video streams for the duration of the music video. The user may continue to make selections among the source video windows as often as desired.

Additionally, in the preferred embodiment, the user may select special effects, or transformations, from an on-screen list or menu in real-time. When selected, these transformations are applied to the selected video stream, or to two or more video streams, in the record video window. Multiple transformations may be selected and applied concurrently.

In addition, the system may provide multiple digital source audio streams. The user may select among source audio streams in a similar manner to the selection among source video streams, or, alternatively, each source audio stream may be associated with a particular source video stream, so that selection of a source video stream results in automatic selection of the associated source audio stream. Transformations may also be performed on the audio streams.

The video stream playing in the record window thus forms a user-arranged version of selected portions of the source video streams, plus transformations, as selected by the user. The selected audio streams, if selectable, form a user-arranged version of the source audio streams, plus transformations. All user inputs are recorded and stored by the system. The user can preview and modify the user-arranged video stream (as well as the associated audio stream), and may then play it back. In playback mode, the user-arranged video stream, including all transformations, is replayed in a larger playback video window, and the associated audio is output.

The system and method of the present invention may also be extended to other digital video and audio editing tasks, aside from music videos, without departing from the spirit or essential characteristics of the invention set forth herein.

BRIEF DESCRIPTION OF THE DRAWINGS

FIGS. 2B and 2C show sample still images of the screen display for the edit mode of the present invention.

FIG. 3A shows the screen display layout for the playback mode of the present invention.

FIGS. 3B and 3C show sample still images of the screen display for the playback mode of the present invention.

FIG. 6A is a timing diagram illustrating an example of the method of operation of the edit mode of the present invention.

FIG. 6B is a timing diagram illustrating a corresponding example of the method of operation of the playback mode of the present invention.

DESCRIPTION OF THE PREFERRED EMBODIMENT

Figure 1:
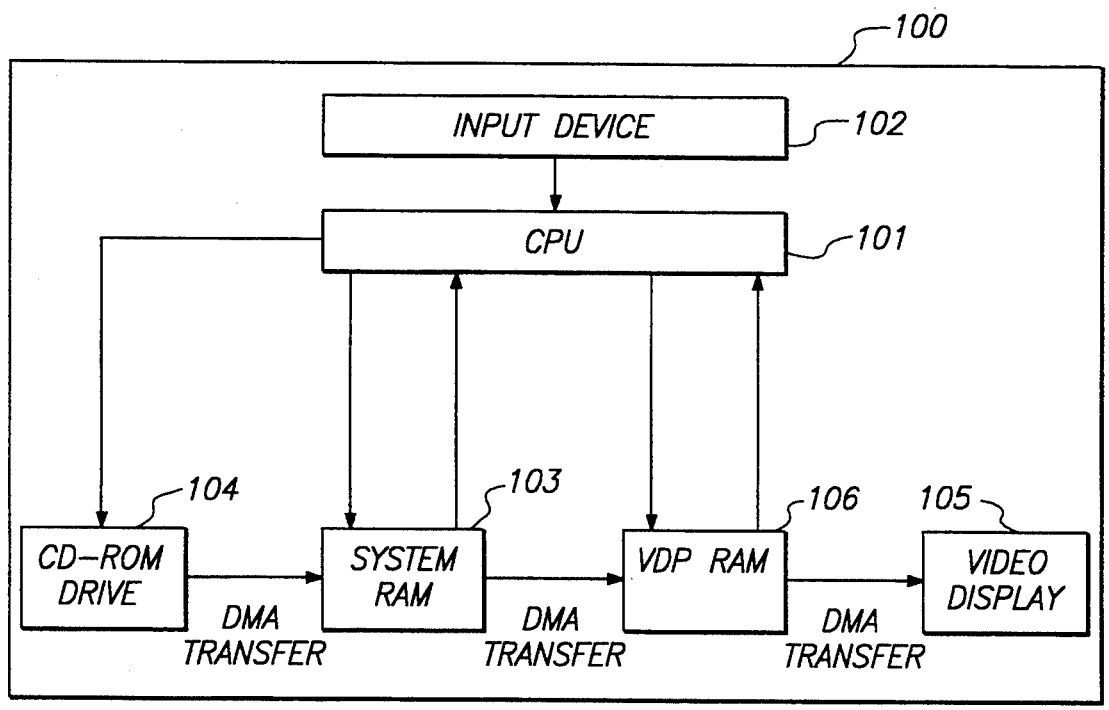
FIG. 1 is a block diagram of apparatus for practicing the present invention.

Referring now to FIG. 1, there is shown a functional block diagram of apparatus 100 for practicing the present invention. In the preferred embodiment, one or more central processing units (CPU) 101 perform the steps of the method, although any type of processor or multiple processors may be used. CPU 101 controls the operation of a digital data storage device containing the various digital data streams which are to be read and processed. An example of such a data storage device is compact disc read only memory (CD-ROM) drive 104 shown in FIG. 1. Input device 102 accepts input from the user and supplies the input to CPU 101. Input device 102 may be a joystick, keyboard, mouse, or other conventional device. In response to control signals from CPU 101, data from CD-ROM drive 104 is sent to system random-access memory (system RAM) 103 via direct memory access (DMA) transfers. Video display processor RAM, or VDP RAM 106, is used for storing video images for use by video display 105. VDP RAM 106 receives data from system RAM 103 via DMA transfers. Video display 105 in turn receives data from VDP RAM 106 via DMA transfers and outputs the data to the user. In the preferred embodiment the data contains both video and audio components, and the video display includes audio output capability.

Alternative structures may be used to practice the current invention. For example, if the data represents audio only, an audio output device may be substituted for video display 105. Similarly, alternative digital data storage devices may be employed in place of CD-ROM drive 104, or the data streams may be supplied to the system from an external digital source (not shown) or a plurality of digital storage devices (not shown), each containing either a single data stream or multiple data streams.

In the preferred embodiment, the digital source data streams stored on the CD-ROM comprise conventional analog video movies that have been converted to a digital format, including binary-encoded video information and control codes suitable for processing by a digital microprocessor, and compressed using any conventional compression technique. The preferred embodiment uses the Lemple-Ziv (LZ) compression technique, which is known to those skilled in the art. Other compression techniques, such as fixed Huffman, adaptive Huffman, or Run-Length, which are all known to those skilled in the art, may also be used.

The compressed data streams are stored on the CD-ROM using the ISO 9660 data format, a conventional digital data format standard. The individual images which form each data stream are represented by a series of bytes on the CD-ROM. The number of bytes needed for storage may vary from image to image due to the varying levels of compression which may be feasible for each image. In order to facilitate system reads of these variable-length byte series, the byte series for each image is preceded by a header specifying the number of bytes to be read for the image. Other types of digital storage schemes may also be used.

Figure 12:
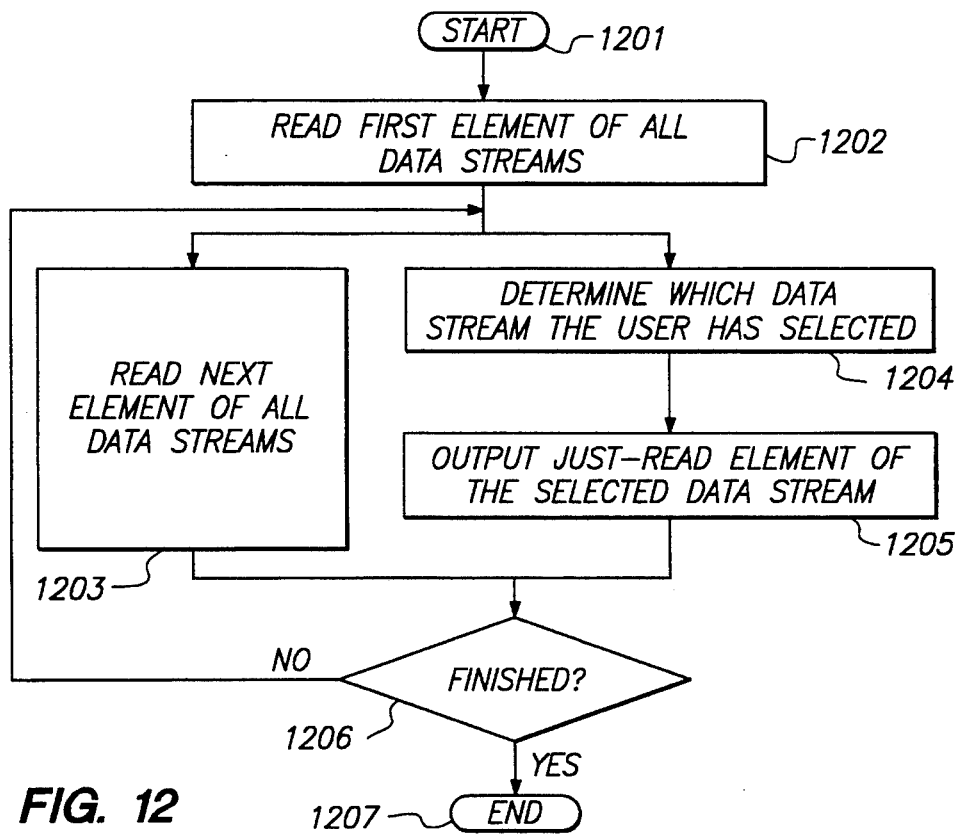
FIG. 12 is a flowchart showing a method of selecting among multiple data streams, in which data is stored in an interleaved fashion, and elements from all data streams are read in each time frame.

In the preferred embodiment, all of the digital source data streams are stored on a single CD-ROM. It has been found preferable to store the source data streams according to a digital interleave technique. Referring now to FIG. 12, there is shown a flowchart of such an interleave technique, for illustrative purposes. Data is arranged on the storage device in an interleaved fashion, so that elements from all data streams for a given time frame are positioned consecutively. In each time frame, the system reads all of the elements from all of the data streams for that frame, and outputs only the element from the selected data stream. Thus, in the case of two interleaved data streams, elements from each data stream are alternately placed on the storage device, and the system reads an element from stream A and one from stream B in each frame, outputting only the selected one. This technique allows the user to select either stream at any time, and the system responds immediately.

In step 1201, the process begins. In step 1202, the system reads the first element of all of the data streams. Then the system proceeds to step 1203, simultaneously with steps 1204 and 1205. In step 1203, the system reads the next element of all of the data streams. While it does this, in step 1204 it determines which data stream is currently selected and in step 1205 the output device outputs the element for the selected data stream which was most recently read. As long as there is more data to be read from the storage device, this loop continues. Once the system is finished with the data, the process ends in step 1207.

Figure 13A:
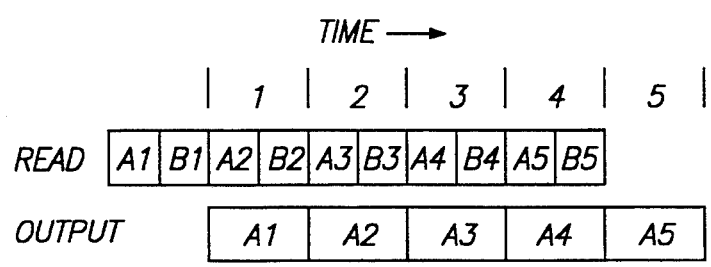
FIGS. 13a and 13b are timing diagrams illustrating an example of the method shown in FIG. 12.
Figure 13B:
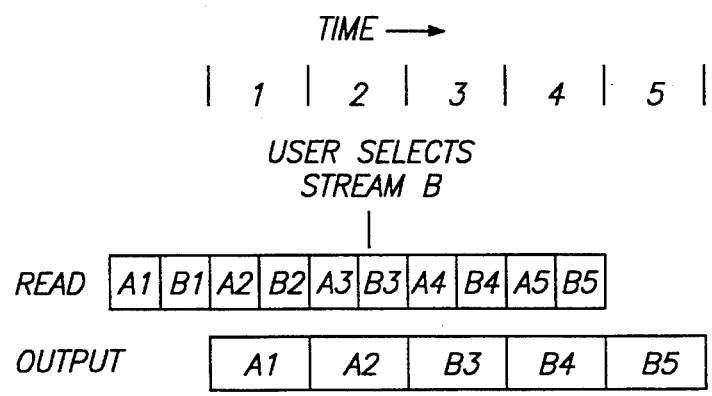

Referring also to FIGS. 13a and 13b, there are shown timing diagrams illustrating an example of the method of FIG. 12. FIG. 13a shows the user electing to remain on stream A, and FIG. 13b shows the user selecting stream B.

In FIG. 13a, the user elects to remain on stream A. Prior to frame 1, the system reads elements A1 and B1

(step 1202). Then, in each frame from 1 to 5, the system outputs the A element for that frame (step 1205) and simultaneously reads the A and B elements for the next frame (step 1203).

In FIG. 13b, the user selects stream B. Prior to frame 1, the system reads elements A1 and B1 (step 1202). In frames 1 and 2, as before, the system outputs the respective A elements (step 1205) and reads both A and B elements (step 1203). During frame 2, the user selects stream B. In frame 3, the system responds to this selection by outputting element B3 instead of A3 (step It still reads both A4 and B4. For the remaining frames, system outputs successive B elements while reading A and B elements for the next frame. Use of such an interleaved storage format facilitates instantaneous switching among data streams for the record video window and the playback video window, as described below.

For purposes of illustration, FIGS. 2A through 6B show implementations involving three digital video data streams, designated A, B, and C, and one digital audio data stream, designated x. All of the techniques described below may be extended to more or fewer video data streams, as well as to multiple audio data streams.

Figure 2A:
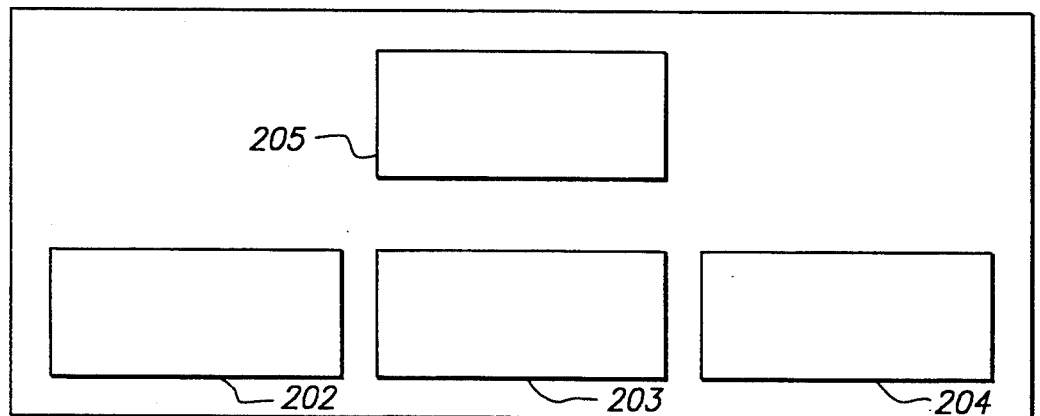
FIG. 2A shows the screen display layout for the edit mode of the present invention.

The preferred embodiment of the invention has two modes: an edit mode and a playback mode. Referring now to FIG. 2A, there is shown the video display 105 in the edit mode. Three source video windows 202, 203, and 204 are shown, along with one record video window 205. Generally, the number of source video windows corresponds to the number of available video data streams, and this number may be greater than or fewer than three, if desired. In addition, during edit mode, the audio data stream is output via conventional audio output means (not shown).

In the preferred embodiment, video display 105 is a conventional character-based video display screen. The system displays multiple windows of motion video using the following technique.

Figure 7:
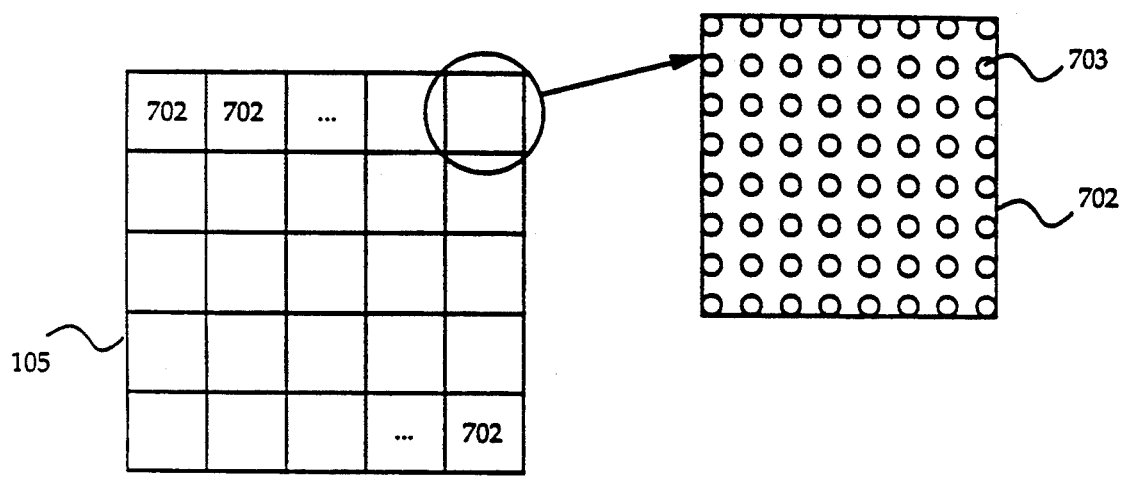
FIG. 7 is a diagram showing division of the display into cards and pixels.

Referring now to FIG. 7, video display 105 is shown divided into a number of regions, known as cards 702. Each card 702 contains a number of pixels 703. The example shown in FIG. 7 uses twenty-five cards, with sixty-four pixels in each card, although the number of cards 702 and pixels 703 may vary according to the size of display 105 and the resolution desired.

Figure 8A:
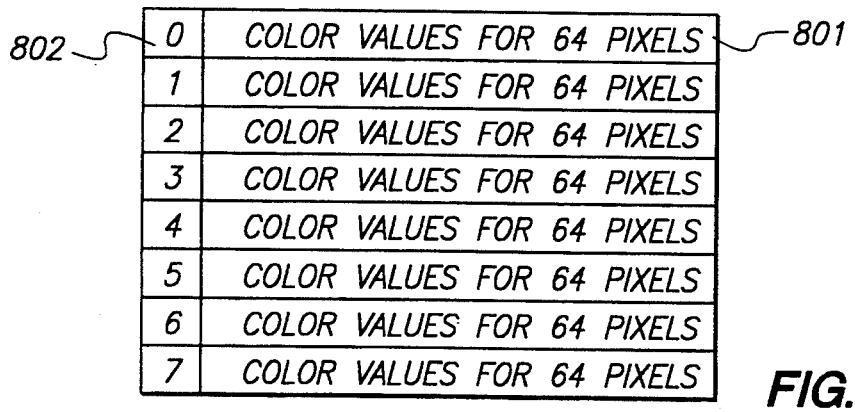
FIG. 8A is a diagram showing an example of character definition storage.
Figure 8B:
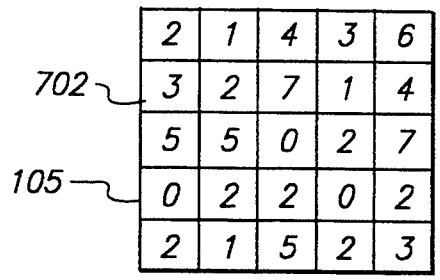
FIG. 8B is a diagram showing an example of screen map storage.

To facilitate the creation of images on display 105, graphical constructs known as characters are used. The size of each character corresponds to the size of a card 702, so that each card 702 can display a single character. In the present invention, a character is defined by providing color values for each of the individual pixels in the character. A screen map specifies which character is to be displayed in each of the cards 702 of display 105. Referring now to FIG. 8A, there is shown an example of the technique of storing a character definition 801 for each of eight characters 802, numbered 0 through 7. Referring now also to FIG. 8B, there is shown an example of the technique of providing a screen map specifying which of the eight characters defined in FIG. 8A is displayed in each of the cards 702 on display 105. In each card 702, a character number is shown, which corresponds to a character definition in FIG. 8A. The character definitions are stored in an area of VDP RAM 106 known as character definition RAM, while the screen maps are stored in an area of VDP RAM 106 known as screen map RAM.

Figure 9A:
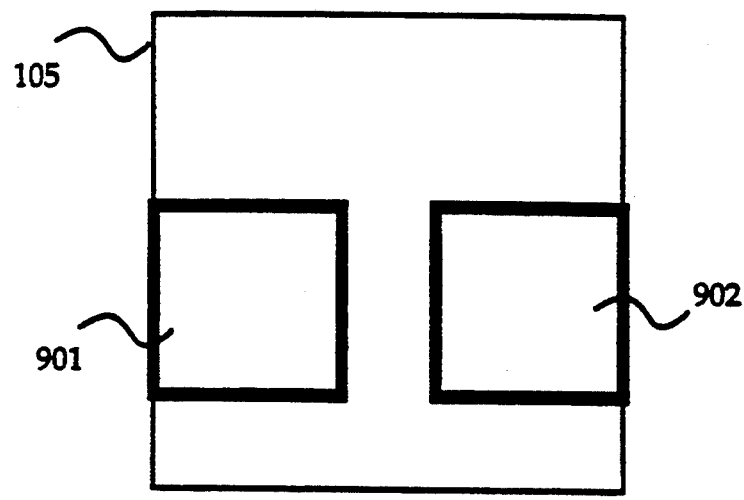
FIG. 9A is a diagram of a sample display with two video windows.
Figure 9B:
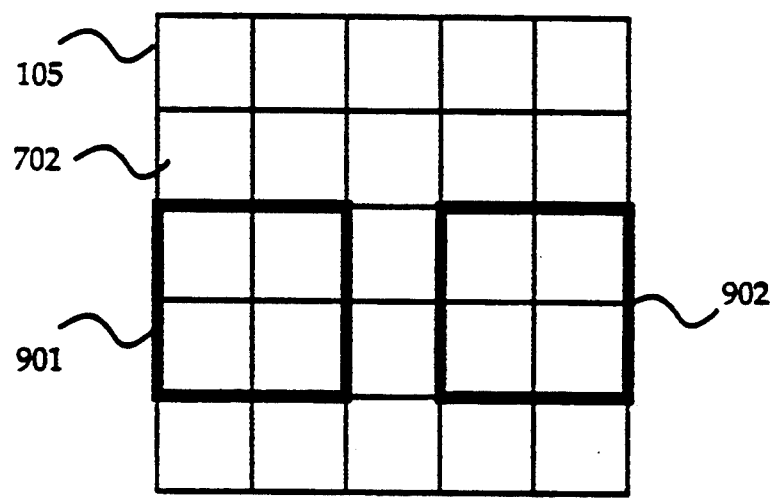
FIG. 9B is a diagram showing an implementation of the sample display of FIG. 9A using cards.

The preferred embodiment displays multiple video windows on display 105 as follows. Each window is defined along card boundaries and hence contains an integral number of cards. Referring now to FIG. 9A, there is shown display 105 with two video windows 901 and 902. As shown in FIG. 9B, video windows 901 and 902 are defined along card boundaries, so that each contains four cards 702.

Figure 10A:
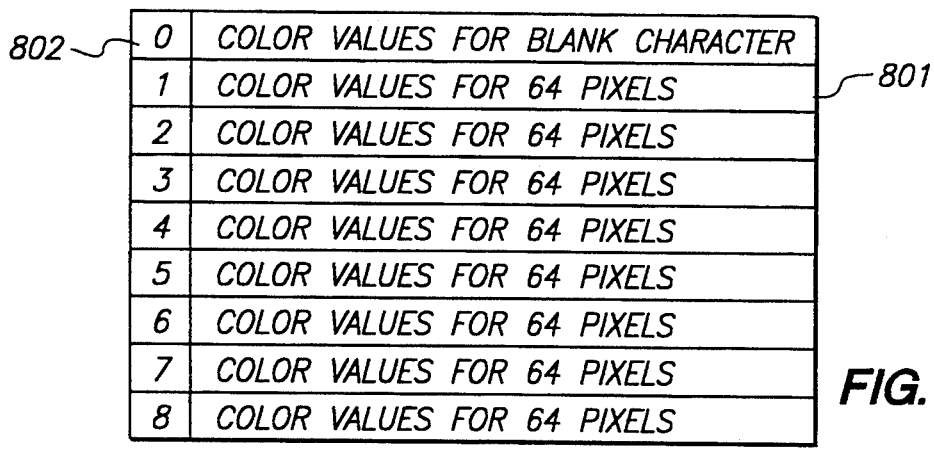
FIG. 10A is a diagram showing character definition storage for the display of FIG. 9B.
Figure 10B:
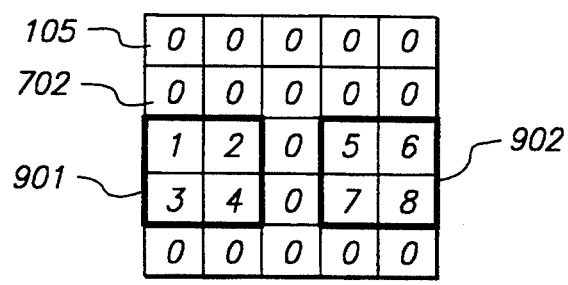
FIG. 10B is a diagram showing screen map storage for the display of FIG. 9B.

Referring now to FIGS. 10A and 10B, there is shown the application of the character-based display technique to the sample two-window display of FIGS. 9A and 9B. In FIG. 10A, there is shown a character definition 801 for each of nine characters 802, numbered 0 through 8. In FIG. 10B, there is shown a screen map specifying which of the eight defined characters is displayed in each of the twenty-five cards 702. Character numbers 1 through 4 are used for window 901, character numbers 5 through 8 are used for window 902, and the remaining seventeen cards contain character number 0, which represents a blank character.

Other embodiments and techniques, using either character-based or non-character-based display screens, may also be used to implement multiple windows on display 105. Alternatively, the source and record video windows may be provided on separate display screens.

In order to provide motion video, new data is placed into the character definition RAM and/or the screen map RAM several times per second. In the preferred embodiment, VDP RAM 106 is available to CPU 101 approximately 10 percent of the time, during the vertical blanking interval of video display device 105. New data is placed in VDP RAM 106 during the vertical blanking interval, using conventional DMA transfers. However, it has been found to take up to four vertical blanking intervals to place all the required new data for a screen image into VDP RAM 106. Since vertical blanking intervals occur every 1/60 second, the present invention provides a new screen image every 1/15 second (in other words, after every fourth vertical blanking interval).

Figure 11A:
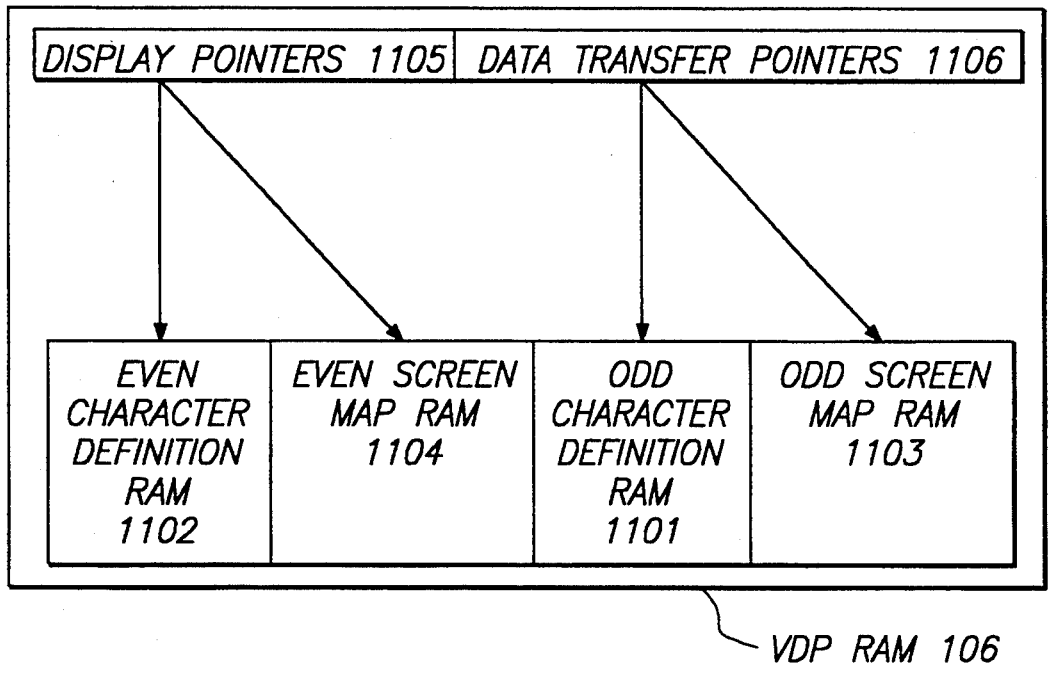
FIG. 11A is a block diagram illustrating double-buffering, showing pointer positions when an even image is being displayed.
Figure 11B:
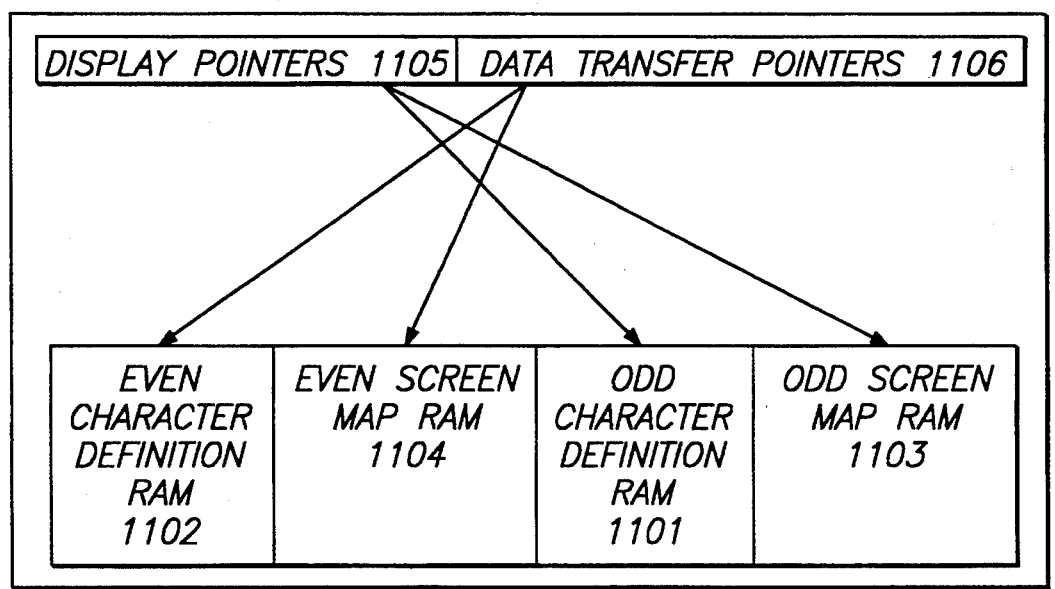
FIG. 11B is a block diagram illustrating double-buffering, showing pointer positions when an odd image is being displayed.

In order to avoid displaying a screen image before all of its data has been transferred into VDP RAM 106, a technique called double-buffering is used, as shown in FIGS. 11A and 11B. Referring now to FIGS. 11A and 11B, VDP RAM 106 contains two sets of character definition RAM, labeled even 1102 and odd 1101, as well as two sets of screen map RAM, labeled even 1104 and odd 1103. Two display pointers 1105 and two data transfer pointers 1106 are also provided. Display pointers 1105 specify which data are to be read for display, while data transfer pointers 1106 specify which data is to be updated by CPU 101. By alternating the positions of pointers 1105 and 1106 for alternate images, the system prevents partially updated images from being displayed.

As shown in FIG. 11A, when an even image is being displayed, display pointers 1105 point to even character definition RAM 1102 and even screen map RAM 1104, while data transfer pointers 1106 point to odd RAM 1101 and 1103. Thus, the system displays the even image and updates the odd image. Once all of the odd image data has been transferred to RAM, the system switches the positions of pointers 1105 and 1106, as shown in FIG. 11B. Display pointers 1105 point to odd RAM 1101 and 1103, while data transfer pointers 1106 point to even RAM 1102 and 1104. Thus, the system displays the odd image and updates the even image. The pointer positions continue to alternate in this fashion for the length of the data stream.

Figure 4:
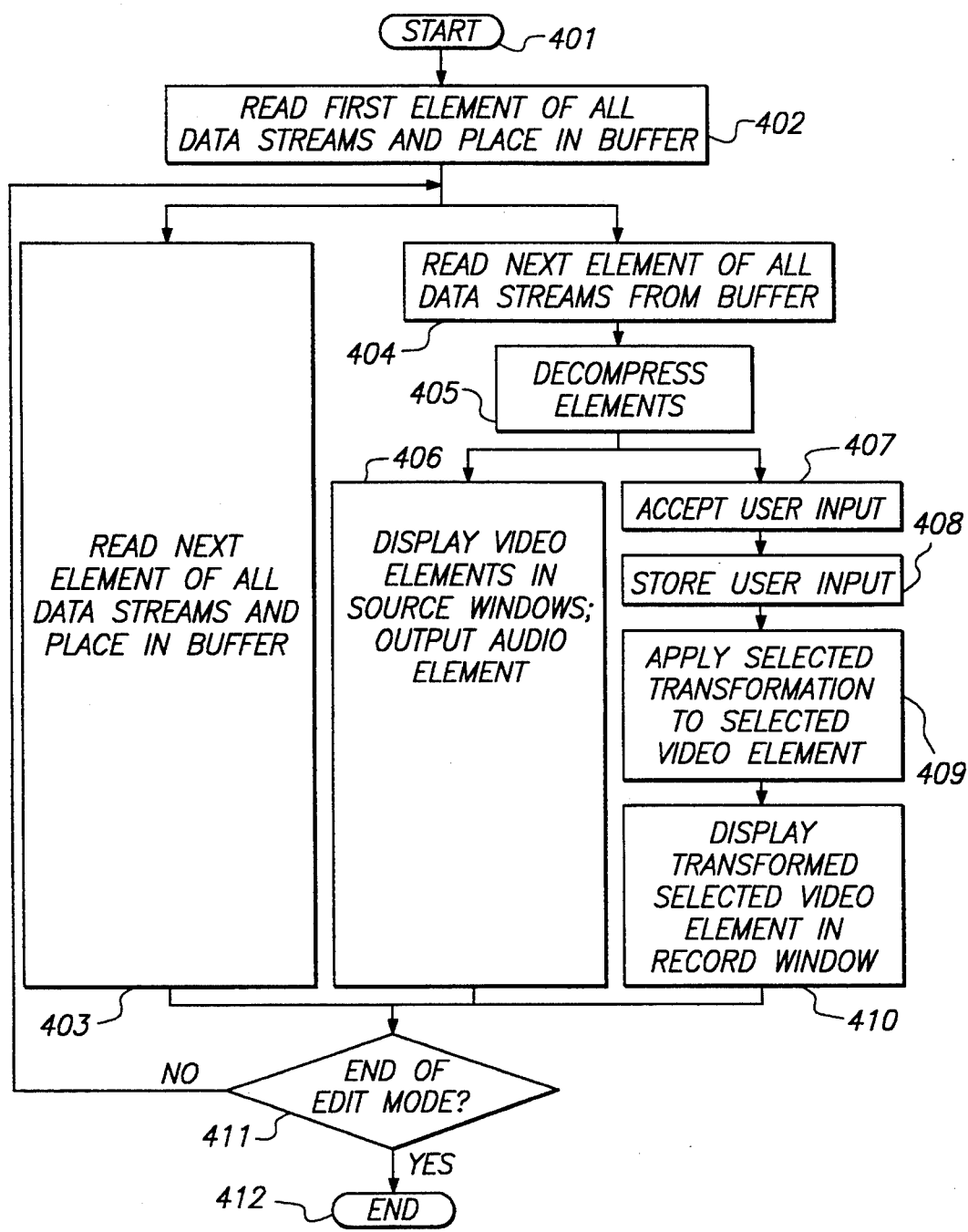
FIG. 4 is a flowchart showing a method of operation of the edit mode of the present invention.

Referring now to FIG. 4, there is shown a flowchart of the operation of the present invention in the edit mode. The system reads 402 the first element, or frame, of all the video data streams, as well as the associated audio data stream, from the CD-ROM, using known digital buffering and DMA techniques. Since the preferred embodiment employs an interleave technique for data stream storage, the first element of all the data streams may be retrieved using a series of sequential CD-ROM reads. The elements are placed in a buffer as they are read.

Two paths extend from step 402, one leading to step 403 and the other leading to steps 404 through 410. In this and other flowcharts, this designation indicates that the two paths occur simultaneously. In other words, step 403 is performed at the same time as steps 404 through 410 are performed. The steps within the two paths may be performed by a single processor or by two different processors.

The system reads 403 the next element of all the video data streams, as well as the associated audio data stream, from the CD-ROM, and places the elements in the buffer as they are read.

Simultaneously with reading 403, the system does the following. It reads 404 previously-stored elements from the buffer, and decompresses 405 these elements using conventional digital decompression techniques. The preferred embodiment uses the LZ decompression technique. The system then displays 406 the decompressed video stream elements in source video windows 202, 203, and 204, and it outputs the associated audio stream element.

Simultaneously with displaying 406, the system accepts input 407 from the user, if any. This input may specify a selected one of source video windows 202, 203, and 204, as well one or more digital transformations (or special effects). Transformations are selected by the user from a scrolling list of icons and/or text representing available video effects. The system may also provide the ability to select a transformation involving two or more source video streams (such as a dissolve from one stream to another). The system then stores 408 the user's input for later use in the playback mode. In the preferred embodiment, this is performed by storing the input in a table in system RAM 103. Each entry in the table represents a user input, and contains a time code representing the time of the input, plus either a source window code representing the selected source window, or a transformation code representing the selected transformation, or both. The time code represents the value of a counter which begins at zero and is incremented every 1/60 of a second. The following is an example of a stored user input table:

| Time | Source Window | Transformation |
| --- | --- | --- |
| 068 | 1 | |
| 135 | 2 | |
| 187 | | FH [Flip Horizontal] |
| 294 | 3 | |
| 394 | | FH |
| 499 | 3 | FH, FV [Flip Vertical] |
| 586 | 2 | |
| 686 | | WS [Window-shade] |

After storing the user input in the table, the system applies 409 the selected transformation(s) to the video element associated with the selected source video window. The techniques of applying these and other similar digital transformations are well known in the art.

As an alternative to storing user input, the system may store the selected video element itself, as transformed. Although this technique generally requires more storage space, it may be preferable in embodiments where it is desired to play back the user-arranged video stream without having to access the original interleaved source data streams.

The system displays 410 the transformed selected video element in record video window 205.

The system then checks 411 to see whether the edit mode has ended. This condition occurs when the system reaches the end of the data streams, or when the user specifies that he or she wishes to end the editing session. If the edit mode has not ended, the system repeats reading, decompressing, etc. 403 through 410. As the system repeats these steps, it continues to display the same selected source video stream in the record video window until the user specifies a different source video stream.

Once the edit mode has been completed, the user may elect to preview and modify the user-arranged video stream. If the user elects to do so, the system repeats the edit mode as described above, with the additional step of applying the user's previous input, as stored in the user input table in system RAM 103, to the images displayed in the record video window. At the same time, the user may provide additional input using the same techniques as described above. The additional input is added to the previous input in the stored user input table, so that the table now contains all inputs from both edit modes.

The user may repeat the edit mode as many times as he or she wishes. Once he or she selects the playback mode, the system proceeds to that mode.

Referring now also to FIG. 2B, there is shown a sample still image of display 105. Each of the source video windows 202, 203, and 204 contains a image displayed as described above. The three images are marked 206, 207, and 208. The preferred embodiment also displays a list of available transformations 211 for user selection. This list may contain icons and/or text representing various transformations or effects, and it may be a scrolling list. In the sample shown in FIG. 2B, the user has selected source video window 203, as indicated by the position of displayed arrow 210, and a transformation called "Flip Vertical", as indicated by the position of displayed arrow 212. Record video window 205 shows image 209, which is the result of applying the selected "Flip Vertical" transformation to selected video stream element 207. Source video window 203 shows the original, untransformed source video stream element 207, so that the user can see the element in both its untransformed and transformed state.

Referring now also to FIG. 2C, there is shown another sample still image of display 105. The displayed images are marked 213, 214, and 215. In this sample, the user has selected source video window 202 and a transformation called "Window-shade", as indicated by the positions of displayed arrows 210 and 212, respectively. Accordingly, record video window 205 shows image 216, which is the result of applying "Window-shade" to selected video stream element 213. Again, the untransformed element 213 still appears in source video window 202.

The samples shown in FIGS. 2B and 2C represent still images only. In the preferred embodiment, the on-screen images are updated, and associated audio is output, continuously as data is read from the CD-ROM, and the user provides all input in real-time.

Referring now to FIG. 3A, there is shown display 105 in the playback mode. In the playback mode, only one video window, called the playback video window 301 is shown, and the system does not accept user input to select data streams or transformations. Rather, the system reads the stored user input which was stored during edit mode to reconstruct the user-arranged data stream as it was shown in record video window 205 in the edit mode. It plays the user-arranged data stream in playback video window 301, and simultaneously outputs the audio data stream as it was output in the edit mode. FIGS. 3B and 3C show sample still images of screen display 105 illustrating operation during playback mode. The video window contents 302 of FIG. 3B correspond to the record video window contents 209 of FIG. 2B. Similarly, the video window contents 303 of FIG. 3C correspond to the record video window contents 216 of FIG. 2C.

Figure 5:
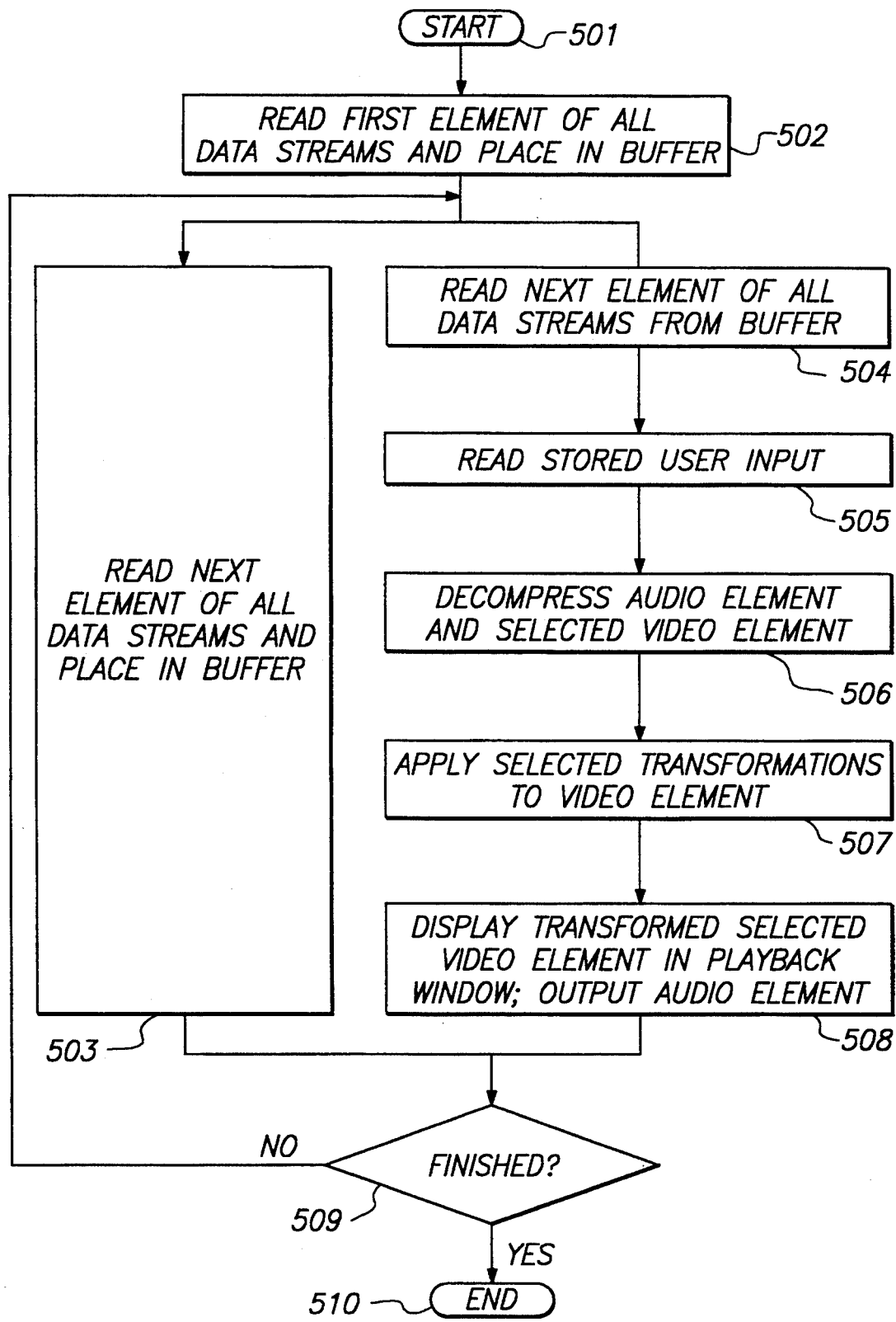
FIG. 5 is a flowchart showing a method of operation of the playback mode of the present invention.

Referring now to FIG. 5, there is shown a flowchart of the operation of the present invention in the playback mode. In playback mode, the system operates in essentially the same manner as it does in the edit mode, except: 1) the system uses stored user input instead of live user input; and 2) only the selected video stream elements are decompressed and displayed, rather than all the source video elements.

The system reads 502 the first element, or frame, of all the video data streams, as well as the first element of the audio data stream, from the CD-ROM. The playback mode data streams may be the same streams that were used in the edit mode, or they may be new digital data streams representing larger versions of the elements found in the original data streams. As with the edit mode, the preferred embodiment employs a digital interleave technique for data stream storage; therefore the first element of all the data streams may be retrieved using a series of sequential CD-ROM reads. The elements are placed in a buffer as they are read.

The system then reads 503 the next element of all the video data streams, as well as the next element of the audio data stream, from the CD-ROM, and places the elements in the buffer as they are read.

Simultaneously with step 503, the system does the following. It reads 504 previously-stored elements from the buffer. The system then reads 505 the user input that was stored 408 in the edit mode. The system decompresses 506 only the selected video element, along with the audio element, according to conventional digital decompression techniques. Again, the preferred embodiment uses the LZ compression technique. Since the playback mode requires the display of only one image at a time, the processor only needs to decompress the one image that is selected for display, rather than all of the stored images. Thus, more processor time is available to perform decompression of the stored images, and the digital compression/decompression techniques used for the playback mode data streams may be more aggressive than those used for the edit mode data streams.

The system applies 507 selected transformations to the decompressed video element, as specified in the stored user input. Then, it displays 508 the transformed video element in the playback video window 301, and outputs the audio element.

The system then checks 509 to see whether the playback mode has ended. This condition occurs when the system reaches the end of the data streams, or when the user specifies that he or she wishes to end the playback session. If the playback mode has ended, the system stops. If not, the system repeats reading, decompressing, etc. 503 through 508.

Referring now to FIGS. 6A and 6B, there are shown timing diagrams illustrating an example of the methods of FIGS. 4 and 5, respectively.

FIG. 6A shows an example of system operation in the edit mode. Six horizontal rows of information are shown. In the top row, a time stream of six frames, numbered 1 to 6, is shown. In the next row, the diagram shows elements being read from the CD-ROM. Each element of the data streams is labeled with a letter and a number, the letter specifying which data stream the element belongs to (A, B, and C represent video, while x represents audio), and the number specifying the proper time for the element to be displayed or output. The third row of the diagram shows user input, including selection of data streams and transformations. The fourth row shows video elements being displayed in the record video window. The fifth row shows audio elements being output. The last row shows user input being stored in system RAM 103.

Prior to time frame 1, the system reads elements A1, B1, C1, and x1 from the CD-ROM, placing each element in the buffer. Then, in frame 1, the system reads these frame 1 elements from the buffer, and decompresses them. It outputs element x1, and displays elements A1, B1, and C1 in the source video windows. No user input has occurred, so the system defaults to video stream A. Thus, it displays element A1 in the record video window. At the same time, it reads elements A2, B2, C2, and x2 from the CD-ROM, placing each element in the buffer.

In time frame 2, the system outputs element x2 and displays elements A2, B2, and C2 in the source video windows. It displays element A2 in the record video window, and reads elements A3, B3, C3, and x3 from the CD-ROM. In this frame, the user supplies input indicating selection of source video stream C. This input is stored in system RAM 103 in the form of the entry "3, C", indicating selection of C in time frame 3.

In time frame 3, the system outputs element x3 and displays elements A3, B3, and C3 in the source video windows. Since the user has selected source video stream C, the system displays element C3 in the record video window. At the same time, it reads elements A4, B4, C4, and x4 from the CD-ROM. Also, in this frame, the user supplies input indicating selection of the "Flip" transformation. This input is stored in system RAM 103 in the form of the entry "4, Flip", indicating selection of the "Flip" transformation in time frame 4.

In time frame 4, the system outputs element x4 and displays elements A4, B4, and C4 in the source video windows. Since the user has selected the "Flip" transformation, the system displays flipped element C4 in the record video window. At the same time, it reads elements A5, B5, C5, and x5 from the CD-ROM.

Time frames 5 and 6 proceed similarly.

FIG. 6B shows an example of system operation in the playback mode, corresponding to the data streams and user inputs shown in the example of FIG. 6A. Five horizontal rows of information are shown. In the top row, a time stream of six frames, numbered 1 to 6, is shown. In the next row, the diagram shows elements being read from the CD-ROM. The next row shows user input as read from system RAM 103. The third row shows video elements being displayed in the playback video window. The fifth row shows audio elements being output.

Prior to time frame 1, the system reads elements A1, B1, C1, and x1 from the CD-ROM, placing each element in the buffer. Then, in frame 1, the system reads these frame 1 elements from the buffer, and decompresses them. It outputs element x1. No user input has occurred, so the system defaults to video stream A. Thus, it displays element A1 in the playback video window. At the same time, it reads elements A2, B2, C2, and x2 from the CD-ROM, placing each element in the buffer.

In time frame 2, the system outputs element x2, displays element A2 in the playback video window, and reads elements A3, B3, C3, and x3 from the CD-ROM. It reads "3, C" from system RAM 103, indicating that the user selected source video stream C for frame 3.

In time frame 3, the system outputs element x3. Since the user selected source video stream C, the system displays element C3 in the playback video window. At the same time, it reads elements A4, B4, C4, and x4 from the CD-ROM. Also, in this frame, the system reads "4, Flip" from system RAM 103, indicating that the user selected the "Flip" transformation for frame 4.

In time frame 4, the system outputs element x4. Since the user selected "Flip", the system displays flipped element C4 in the playback video window. At the same time, it reads elements A5, B5, C5, and x5 from the CD-ROM.

Time frames 5 and 6 proceed similarly.

The preferred embodiment may also provide multiple digital audio streams as well as digital video streams. The audio streams may be stored in interleaved format on the CD-ROM in a similar manner as for video stream storage. The system may permit the user to select among the audio streams in a similar manner as the selection among video streams. Alternatively, each audio stream may be associated with a particular video stream, so that selection of a video stream results in automatic selection of the associated audio stream. Transformations may also be performed on audio streams. User input regarding selection of audio streams and audio transformations may be stored and played back in the same manner as storage and playback of user input regarding video streams.

Therefore, the invention provides a novel and advantageous method of selecting among simultaneously accessible on-screen digital source video streams in real-time to form a digital user-arranged video stream. The foregoing discussion discloses and describes merely exemplary methods and embodiments of the present invention. As will be understood by those familiar with the art, the invention may be embodied in other specific forms without departing from the spirit or essential characteristics thereof. For example, other digital data stream storage techniques may be used in place of the single CD-ROM interleaved format described above. In addition, the system and method described above may be extended to other digital video and audio editing tasks, aside from music videos. Accordingly, the disclosure of the present invention is intended to be illustrative, but not limiting, of the scope of the invention, which is set forth in the following claims.

What is claimed is:

1. A method of interactively forming and editing a digital user-arranged video stream in real-time from a plurality of simultaneously-displayed digital source video streams stored in an interleaved format on a common storage medium, comprising the steps of:

reading each digital source video stream from the common storage medium;

displaying each read digital source video stream in separate windows on a common display device;

during the display of the source video streams, accepting a first user input specifying selected portions of the source video streams;

forming a digital user-arranged video stream comprising a series of user-selected portions of the source video streams selected in response to the first user input; and during the display of the source video streams, displaying the digital user-arranged video stream in a separate video window on the common display device.

2. The method of claim 1, further comprising the steps of selectively re-editing the digital user-arranged video stream.

3. The method of claim 1, wherein:

the digital source video streams each comprise a plurality of digital source video images stored in a compressed format;

and further comprising decompressing each digital source video image before displaying it.

4. The method of claim 3, wherein:

each digital source video image is stored in a compressed format according to a Lempel-Ziv compression technique; and the decompression step comprises decompressing each digital source video image according to a Lempel-Ziv decompression technique.

5. The method of claim 3, wherein each digital source video image is stored in a compressed format according to a fixed Huffman compression technique; and the decompression step comprises decompressing each digital source video image according to a fixed Huffman decompression technique.

6. The method of claim 3, wherein:

each digital source video image is stored in a compressed format according to an adaptive Huffman compression technique; and the decompression step comprises decompressing each digital source video image according to an adaptive Huffman decompression technique.

7. The method of claim 3, wherein:

each digital source video image is stored in a compressed format according to a Run-Length compression technique; and the decompression step comprises decompressing each digital source video image according to a Run-Length decompression technique.

8. The method of claim 3, wherein a digital source audio stream is stored on the common storage medium interleaved with the digital source video streams, the method further comprising the steps of:

reading a digital source audio stream from the common storage medium; and simultaneously with the step of displaying the digital user-arranged video stream, outputting the read digital source audio stream.

9. The method of claim 8, further comprising the step of selectively re-editing the digital user-arranged video stream.

10. The method of claim 1, further comprising the steps of:
  storing a plurality of time-coded data stream indicators representing the user selections; and
  after the digital user-arranged video stream has been formed, selectively performing the substeps of:
    reading each digital source video stream from the common storage medium;
    reading the stored time-coded data stream indicators; and
    displaying selected portions of the digital source video streams as indicated by the time-coded data stream indicators in order to replay the digital user-arranged video stream.

11. The method of claim 10, further comprising the steps of:
  during the replaying of the digital user-arranged video stream, accepting a second user input specifying selected portions of the source video streams;
  forming a second digital user-arranged video stream comprising a series of user-selected portions of the source video streams selected in response to the first user input and the second user input; and displaying the second digital user-arranged video stream in a separate video window on the common display device.

12. The method of claim 1, further comprising the steps of:
  during the display of the source video streams, accepting a third user input specifying at least one selected video transformation; and
  performing the selected video transformation on the digital user-arranged video stream; and
  wherein the step of displaying the digital user-arranged video stream comprises displaying the transformed digital user-arranged video stream.

13. The method of claim 12, further comprising the steps of:
  storing a first plurality of time-coded data stream indicators representing the user selections;
  storing a second plurality of time-coded transformation indicators representing the user-selected transformations;
  after the digital user-arranged video stream has been formed, selectively performing the substeps of:
    reading each digital source video stream from the common storage medium;
    reading the stored time-coded data stream indicators and transformation indicators; and
    transforming and displaying selected portions of the digital source video streams as indicated by the time-coded data stream indicators and transformation indicators in order to replay the digital user-arranged video stream with user-selected transformations.

14. A method of interactively forming and editing digital user-arranged video and audio streams in real-time from a plurality of simultaneously-displayed digital source video streams and a plurality of digital source audio streams, the plurality of digital source video and audio streams being stored in an interleaved format on a common storage medium, comprising the steps of:
  reading each digital source video stream from the common storage medium;
  reading each digital source audio stream from the common storage medium;
  displaying each read digital source video stream in separate windows on a common display device;
  during the display of the source video streams, accepting a first user input specifying selected portions of the source video streams and a fourth user input specifying selected portions of the source audio streams;
  forming a digital user-arranged video stream comprising a series of user-selected portions of the source video streams selected in response to the first user input;
  forming a digital user-arranged audio stream comprising a series of user-selected portions of the digital source audio streams selected in response to the fourth user input; and
  during the display of the source video streams, performing the substeps of:
    displaying the digital user-arranged video stream in a separate video window on the common display device; and
    outputting the digital user-arranged audio stream.

15. The method of claim 14, further comprising the step of selectively re-editing the digital user-arranged video stream.

16. The method of claim 14, further comprising the steps of:
  storing a plurality of time-coded data stream indicators representing the user selections; and
  after the digital user-arranged video and audio streams have been formed, selectively performing the steps of:
    reading each digital source video stream from the common storage medium;
    reading each digital source audio stream from the common storage medium;
    reading the stored time-coded data stream indicators;
    displaying selected portions of the digital source video streams as indicated by the time-coded data stream indicators in order to replay the digital user-arranged video stream; and
    outputting selected portions of the digital source audio streams as indicated by the time-coded data stream indicators in order to replay the digital user-arranged audio stream.

17. The method of claim 16, further comprising the steps of:
  during the replaying of the digital user-arranged video and audio streams, accepting a fifth user input specifying selected portions of the source video stream;
  during the replaying of the digital user-arranged video and audio streams, accepting a sixth user input specifying selected portions of the source audio stream;
  forming a second digital user-arranged video stream comprising a series of user-selected portions of the source video streams selected in response to the first user input and the fifth user input;
  forming a second digital user-arranged audio stream comprising a series of user-selected portions of the source audio streams selected in response to the fourth user input and the sixth user input;
  displaying the second digital user-arranged video stream in a separate video window on the common display device; and
  outputting the second digital user-arranged audio stream.

18. The method of claim 14, further comprising the steps of:

during the display of the source video streams, accepting a seventh user input specifying at least one selected audio transformation;
performing the selected audio transformation on the digital user-arranged audio stream; and
wherein the step of outputting the digital user-arranged audio stream comprises outputting the transformed digital user-arranged audio stream.

19. The method of claim 18, further comprising the steps of:
storing a first plurality of time-coded data stream indicators representing the user selections;
storing a second plurality of time-coded transformation indicators representing the user-selected transformations;
after the digital user-arranged video and audio streams have been formed, selectively performing the steps of:
reading each digital source video stream from the common storage medium;
reading each digital source audio stream from the common storage medium;
reading the time-coded data stream indicators and transformation indicators;
transforming and displaying selected portions of the digital source video streams as indicated by the time-coded data stream indicators and transformation indicators in order to replay the digital user-arranged video stream with user-selected transformations; and
transforming and outputting selected portions of the digital source audio streams as indicated by the time-coded data stream indicators and transformation indicators in order to replay the digital user-arranged audio stream with user-selected transformations.

20. A system for interactively forming and editing a digital user-arranged video stream in real-time from a plurality of simultaneously-displayed digital source video streams stored in an interleaved format on a common storage medium, comprising:
a common storage medium for storing the digital source video streams in an interleaved format;
an input device for accepting user input during display of the source video streams;
a processor connected to the digital storage device and to the input device, for reading the digital source video streams and forming the digital user-arranged video stream from user-selected portions of the digital source video streams in response to the user input; and
a video display device connected to the processor, comprising:
a plurality of source video windows on a common screen for simultaneously displaying the digital source video streams; and
a record video window on the common screen for displaying the digital user-arranged video stream simultaneously with the display of the digital source video streams.

21. The system of claim 20, further comprising:
an input storage device for storing a plurality of time-coded data stream indicators representing the user selections; and
wherein the video display further comprises a selectively-activated video window for displaying selected portions of the digital source video streams as indicated by the time-coded data stream indicators in order to replay the digital user-arranged video stream.

22. The system of claim 20, further comprising transformation means connected to the processor for performing user-selected real-time transformations on the digital user-arranged video stream in response to the user input.

23. A system for interactively forming and editing digital user-arranged video and audio streams from a plurality of simultaneously-displayed digital source video streams and a plurality of digital source audio streams, the source audio and video streams being stored in an interleaved format on a common storage medium, comprising:
a common storage medium for storing the digital source video and audio streams in an interleaved format;
an input device for accepting user input during display of the source video streams;
a processor connected to the storage device and to the input device, for reading the digital source video and audio streams and forming the digital user-arranged video and audio streams from user-selected portions of the digital source video and audio streams in response to the user input;
a video display device connected to the processor, comprising:
a plurality of source video windows on a common screen for simultaneously displaying the digital source video streams; and
a record video window on the common screen for displaying the digital user-arranged video stream simultaneously with the display of the digital source video streams; and
an audio output device connected to the processor for outputting the digital user-arranged audio stream simultaneously with the display of the digital source video streams.

24. The system of claim 23, further comprising:
an input storage device for storing a plurality of time-coded data stream indicators representing the user selections; and
wherein the video display further comprises a selectively-activated video window for displaying selected portions of the digital source video streams as indicated by the time-coded data stream indicators in order to replay the digital user-arranged video stream; and
wherein the audio output device further outputs selected portions of the digital source audio streams as indicated by the time-coded data stream indicators in order to replay the digital user-arranged audio stream.

25. The system of claim 23, further comprising transformation means connected to the processor for performing user-selected real-time transformations on the digital user-arranged video and audio streams in response to the user input.

26. The system of claim 21, wherein:
the input device further accepts additional user input during replaying of the digital user-arranged video stream; and
the processor further forms a second digital user-arranged video stream from user-selected portions of the digital source video streams in response to the user input and the additional user input.

27. The system of claim 24, wherein:

the input device further accepts additional user input during replaying of the digital user-arranged video and audio streams; and the processor further forms a second digital user-arranged video stream and a second digital user-arranged audio stream from user-selected portions of the digital source video and audio streams in response to the user input and the additional user input.

* * * * *